M. C. HOFF.
HARVESTER PITMAN.
APPLICATION FILED MAY 4, 1921.
1,399,861.
Patented Dec. 13, 1921.
2 SHEETS—SHEET 1.
Fig. 1.
Fig. 2.
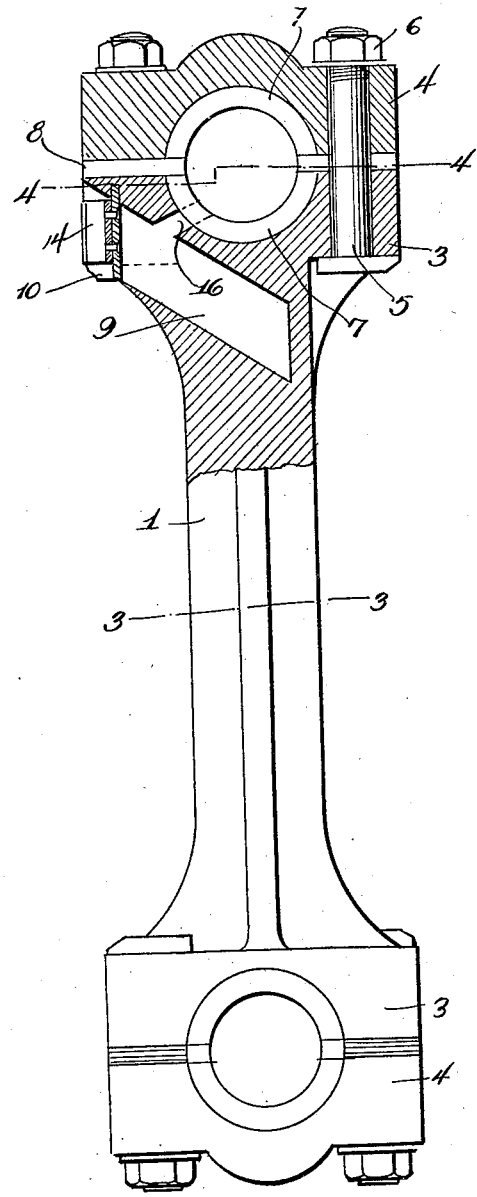
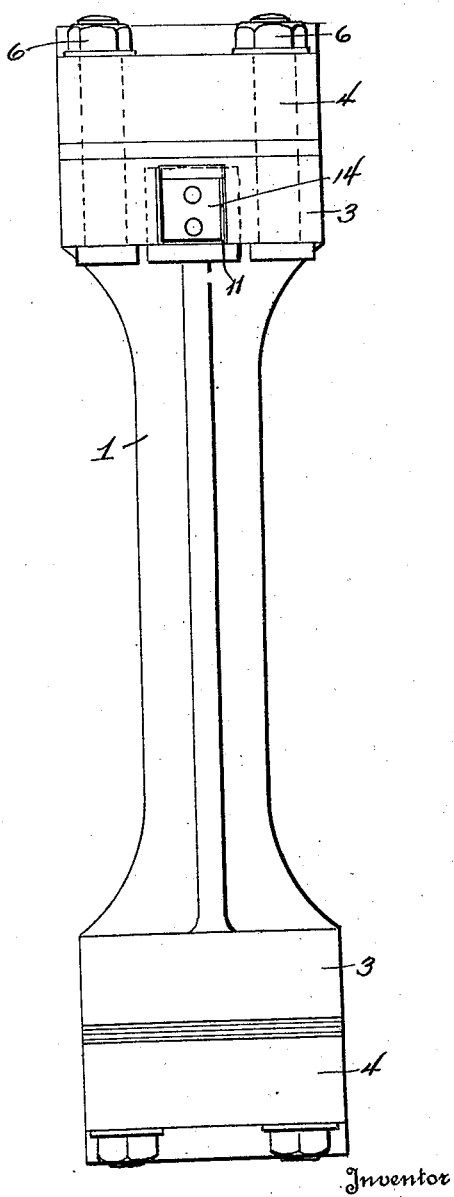
Inventor
Matthew C. Hoff

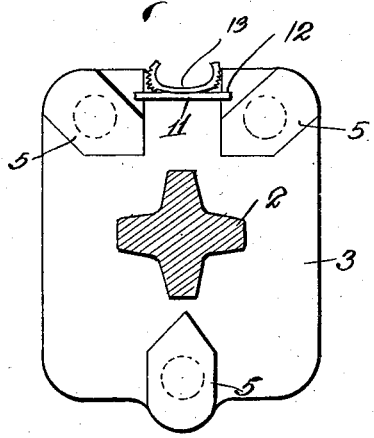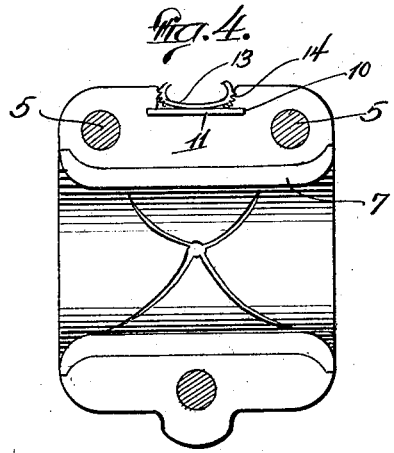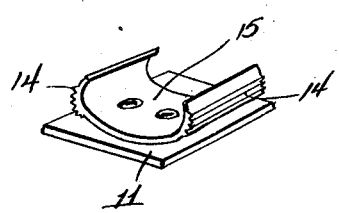

UNITED STATES PATENT OFFICE.

MATTHEW C. HOFF, OF HUTCHINSON, KANSAS.

HARVESTER-PITMAN.

1,399,861. Specification of Letters Patent. Patented Dec. 13, 1921.

Application filed May 4, 1921. Serial No. 466,657.

*To all whom it may concern:*

Be it known that I, MATTHEW C. HOFF, a citizen of the United States, residing at Hutchinson, in the county of Reno and State of Kansas, have invented certain new and useful Improvements in Harvester-Pitmen, of which the following is a specification.

This invention relates to improvements in pitmen and more particularly to an improved structure for harvester-pitmen rods.

The primary object of the invention is to provide an improved structure which will give additional strength and durability to the pitman, and which will eliminate lost motion as the parts become worn, thus preventing the damage to sickles and cutting elements.

Other objects of the invention will appear upon consideration of the following detail description and accompanying drawings, wherein:—

Figure 1 is an elevation, partly in section showing the pitman constructed in accordance with my invention, Fig. 2 is a plan view of the same, Fig. 3 is a cross section taken approximately on the line 3—3 of Fig. 1, Fig. 4 is a cross section taken approximately on the line 4—4 of Fig. 1, Fig. 5 is a detail view of the cover for the oil well.

Referring to the drawing by numerals, the shank 1 may be of any desired length and is substantially star shaped in cross section as shown in Fig. 3, this structure being obtained by providing longitudinal ribs 2 extending throughout the length of the shank. At each end of the shank is an enlarged head portion 3 which forms a part of the bearing, and the head portion is provided with a removable bearing cap 4 which is held in position by bolts 5 extending through properly located openings and provided with nuts 6 whereby the bolts and nuts may act to hold the two portions of the bearing 3 and 4 in proper relative position. The adjacent portions of the head 3 and bearing cap 4 are provided with semi-cylindrical cut out portions within which the bearing sleeves 7 are mounted to properly form the bearing which embraces the crank. The crank or wrist pin which extends through the bearing is embraced by the members 7 in the usual manner, and removable shims 8 are provided between the adjacent faces of the parts 3 and 4 whereby the wear may be provided for when the device has been used.

To provide proper lubrication for the bearing an oil well 9 is formed in the head 3, which it will be noted, is disposed at an angle with respect to the transverse center line of the bearing, and this well is adapted to contain a quantity of oil or any suitable lubricant. A removable spring cap 10 is provided for the top of the oil well, and this as shown in Fig. 5 consists of a plate 11, the marginal edges of which are adapted to be engaged in opposite grooves 12 formed in the head 3. These grooves are formed by inwardly cut portions at opposite sides of a recess 13 within which the cap is located, and the opposite walls of the recess 13 are corrugated to engage the corrugations 14 on the spring clip 15 which is carried by the plate 11 as shown in Fig. 5 so that when the cap is mounted in position the corrugations will serve to maintain the removable cap in tight engagement with the top of the well to prevent any oil from being displaced. An angularly disposed passage-way 16 extends from the well to the bearing and this passage-way communicates with the upper portion of the well, its angular position being opposite to that of the well 9 so that reciprocation of the piston will cause the oil to be splashed upwardly and permit a portion of the oil to be received in the passage-way 16 whereby it may be conducted to the bearing. Each of the bearing sleeves are provided with channels whereby the oil may be distributed evenly over the surface of the bearing as shown in Fig. 4 of the drawing. Of course, both ends of the pitman will be constructed in the same manner so that the crank and wrist pin may be connected to the pitman and be properly lubricated and the wear provided for.

Minor changes may be made in the details of construction without departing from the spirit of the invention or the scope of the claims hereunto appended.

What is claimed is:—

1. A pitman of the character described comprising an elongated shank having a head at each end, a removable cap adapted to be attached to each head, each cap being provided with a semi-cylindrical recess, bearing sleeves mounted in each recess, fastening elements for holding the said caps in position on the heads, removable shims adapted to be disposed between the heads and the said removable caps, the head being provided with an angularly disposed oil well, a removable spring cap for closing the open end of the well, an angular passage-way extending from the said angular oil well to the said recess in the head, the angular position of the well being such as to cause the oil to splash upwardly when the pitman is reciprocated whereby a portion of the oil will be distributed in the said passage-way to be conducted to the said sleeves.

2. A harvester pitman of the character described comprising an elongated shank, a head arranged at each end of the shank, each head being provided with a substantially semi-circular recess, a removable cap for each head, each cap being provided with a semi-circular recess for forming a cylindrical opening at each end of the pitman, fastening elements to hold the said caps in position on the heads, means for providing a lining for each of the said openings, an oil well formed in each head, the said well being disposed at an angle with respect to the transverse center line of the head, a removable cap for the open end of the oil well, a passage-way disposed at an angle opposite to that of the said oil well and extending from the oil well to the said opening whereby reciprocation of the pitman will cause the oil to be splashed toward the top of the well to be conducted partially through the passage-way to the said opening.

In testimony whereof, I have affixed my signature in the presence of two witnesses.

MATTHEW C. HOFF.

Witnesses:
S. A. HOFF,
R. S. HOFF.